United States Patent
Pohl et al.

(10) Patent No.: US 12,185,210 B2
(45) Date of Patent: Dec. 31, 2024

(54) SYSTEMS AND METHODS FOR PAIRING DEVICES USING VISUAL RECOGNITION

(71) Applicant: Intel Corporation, Santa Clara, CA (US)

(72) Inventors: Daniel Pohl, Puchheim (DE); Tomer Rider, Nahariya (IL); Wenlong Yang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 350 days.

(21) Appl. No.: 17/253,998

(22) PCT Filed: Dec. 24, 2018

(86) PCT No.: PCT/CN2018/123202
§ 371 (c)(1),
(2) Date: Dec. 18, 2020

(87) PCT Pub. No.: WO2020/132831
PCT Pub. Date: Jul. 2, 2020

(65) Prior Publication Data
US 2021/0311893 A1    Oct. 7, 2021

(51) Int. Cl.
*H04W 4/80* (2018.01)
*G06F 3/01* (2006.01)
(Continued)

(52) U.S. Cl.
CPC .............. *H04W 4/80* (2018.02); *G06F 3/017* (2013.01); *G06F 13/22* (2013.01); *G06T 7/70* (2017.01);
(Continued)

(58) Field of Classification Search
CPC ......... H04B 7/26; H04B 17/318; G06F 13/22; G06F 3/017; H04W 12/63; H04W 4/80; G06T 7/70
See application file for complete search history.

(56) References Cited

U.S. PATENT DOCUMENTS 8,706,162 B1    4/2014  Abrahamsson
9,436,805 B1 *  9/2016  Kravets
(Continued)

FOREIGN PATENT DOCUMENTS

CN    107534653 A    1/2018
EP      3204837 A1   8/2017
(Continued)

OTHER PUBLICATIONS

Jarvis et al., "Indoor Positioning System" created Nov. 30, 2011; last modified Dec. 1, 2011.
(Continued)

*Primary Examiner* — Phong H Dang
(74) *Attorney, Agent, or Firm* — Fletcher Yoder P.C.

(57) ABSTRACT

The present disclosure is directed at pairing a host electronic device with a peripheral electronic device using visual recognition and deep learning techniques. In particular, the host device may receive an indication of a peripheral device via a camera or as a result of searching for the peripheral device (e.g., due startup of a related application or periodic scanning). The host device may also receive an image of the peripheral device (e.g., captured via the camera), and determine a visual distance to the peripheral device based on the image. The host device may also determine a signal strength of the peripheral device, and determine a signal distance to the peripheral device based on the signal strength. The host device may pair with the peripheral device if the visual distance and the signal distance are approximately equal.

20 Claims, 5 Drawing Sheets

(51) Int. Cl.
  *G06F 13/22* (2006.01)
  *G06T 7/70* (2017.01)
  *H04B 7/26* (2006.01)
  *H04B 17/318* (2015.01)
  *H04W 12/63* (2021.01)

(52) U.S. Cl.
  CPC ............ *H04B 7/26* (2013.01); *H04B 17/318* (2015.01); *H04W 12/63* (2021.01); *G06T 2207/20081* (2013.01)

(56) References Cited

U.S. PATENT DOCUMENTS

| | | | | |
|---|---|---|---|---|
| 10,820,360 | B1* | 10/2020 | Glaenzer | H04W 48/16 |
| 2012/0083209 | A1* | 4/2012 | Giles | H04W 12/082 |
| | | | | 455/41.2 |
| 2014/0134948 | A1* | 5/2014 | Ghose | H04W 4/80 |
| | | | | 455/41.2 |
| 2015/0023562 | A1* | 1/2015 | Moshfeghi | G01S 5/0289 |
| | | | | 382/106 |
| 2015/0133051 | A1 | 5/2015 | Jamal-Syed | |
| 2016/0285299 | A1* | 9/2016 | Amand | H02J 50/80 |
| 2017/0070820 | A1* | 3/2017 | Behringer | G06V 20/20 |
| 2017/0231022 | A1* | 8/2017 | Ito | H04W 76/10 |
| 2017/0242480 | A1* | 8/2017 | Dees | G06F 3/013 |
| 2018/0091523 | A1* | 3/2018 | Plany | H04W 12/06 |
| 2018/0249519 | A1* | 8/2018 | Hanes | G06F 13/102 |
| 2018/0341448 | A1 | 11/2018 | Behzadi | |
| 2019/0077507 | A1* | 3/2019 | Ferris | H04N 17/004 |
| 2019/0079510 | A1* | 3/2019 | Ferris | G05D 1/0038 |
| 2021/0112222 | A1* | 4/2021 | Triano | H04N 23/51 |
| 2022/0414042 | A1* | 12/2022 | Butler | G06F 3/0482 |

FOREIGN PATENT DOCUMENTS

| | | |
|---|---|---|
| WO | 2016017945 A1 | 2/2016 |
| WO | 2016055317 A1 | 4/2016 |
| WO | 20170305847 A1 | 2/2017 |
| WO | 2017069466 A1 | 4/2017 |

OTHER PUBLICATIONS

Ali et al., "Distance Estimation and Vehicle position detection Based on Monocular Camera" 2016 Al-Sadeq International Conference on Multidisciplinary in IT and Communication Science and Applications (AIC-MITCSA)—Iraq (May 9-10).

Joglekar et al., "Depth Estimation Using Monocular Camera" International Journal of Computer Science and Information Technologies, vol. 2 (4), 2011; ISSN:09759646.

Alizadeh et al., "A Real-Time Object Distance Measurement Using a Monocular Camera" Proceedings of the LASTED International Conference Modelling and Simulation (MS 2013) Jul. 17-19, 2013 Banff, Canada.

International Search Report and Written Opinion for International Application No. PCT/CN2018/123202 mailed May 29, 2019.

International Search Report and Written Opinion for International Application No. PCT/CN2018/123202 mailed Jun. 30, 2022.

International Search Report and Written Opinion for Korean Application No. 10-2020-7035959 mailed Mar. 27, 2024.

* cited by examiner

SYSTEMS AND METHODS FOR PAIRING DEVICES USING VISUAL RECOGNITION

CROSS REFERENCE TO RELATED APPLICATION

This application is a U.S. national stage filing of PCT Application Serial No. PCT/CN2018/123202, filed Dec. 24, 2018, and entitled "SYSTEMS AND METHODS FOR PAIRING DEVICES USING VISUAL RECOGNITION," which is incorporated by reference herein in its entirety for all purposes.

BACKGROUND

This disclosure relates generally to pairing a peripheral electronic device to a host electronic device.

This section is intended to introduce the reader to various aspects of art that may be related to aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Over the last few years, wireless peripheral devices have gained popularity and spread all across user homes. These peripheral devices may include small devices to bigger mainstream home appliances. Besides earphones, various other devices like virtual reality peripherals, mousing devices, keyboards, smart home devices, and many more are part of our daily life. However, despite such ubiquitous popularity, the process of pairing the peripheral devices, for example, a smartphone with wireless headphones, is not standardized and often requires pressing certain buttons for a certain time in a certain order, and may require an unnecessary look into the user manual.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure describes systems and methods for pairing a peripheral electronic device to a host electronic device using visual recognition and/or machine learning (e.g., deep learning). In particular, the host device may receive an indication of a peripheral device via a sensor (e.g., a camera) or as a result of searching for the peripheral device (e.g., due startup of a related application or periodic scanning). The host device may also receive an image of the peripheral device (e.g., captured via the sensor), and determine a visual distance to the peripheral device based on the image. The host device may also determine a signal strength of the peripheral device, and determine a signal distance to the peripheral device based on the signal strength. The host device may pair the peripheral device to the host device if the visual distance and the signal distance are approximately equal.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

A wireless peripheral electronic device (e.g., a set of earphones, headphones, speakers, a keyboard, mousing device, car stereo, printer, webcam, or smart home device) may be paired to a host electronic device (e.g., a smartphone, wearable device, virtual reality or mixed reality headset, tablet, desktop computer, laptop computer, or other computing device) to enable the host device to control and use the peripheral device. To pair the peripheral device, a user often manually places both the peripheral device and the host device in respective pairing modes. For example, the user may navigate through a configuration menu on the host device to place the host device in a pairing mode. The host device may then search for pairable devices. The user may also depress a button of the peripheral device for three seconds to place the peripheral device in a pairing mode. Once the host device discovers the peripheral device, the user may often manually select the peripheral device from a list of devices, and then confirm that the peripheral device is the device the user desires to be paired to the host device. Once confirmed, the host device may finally pair to the peripheral device.

In some cases, the pairing may be performed by placing the host device in a passcode entry mode to enter a passcode associated with the peripheral device, in a scanning mode to scan a QR code on the peripheral device with a camera of the host device, or in a network discovery mode to discover the peripheral device via connectivity of the peripheral device to a network. However, in each case, a user may perform additional actions to complete the pairing.

The present disclosure describes systems and methods for pairing a peripheral electronic device to a host electronic device using visual recognition and/or machine learning (e.g., deep learning). In particular, the host device may receive an indication of a peripheral device via a sensor (e.g., a camera) or as a result of searching for the peripheral device (e.g., due startup of a related application or periodic scanning). The host device may also receive an image of the peripheral device (e.g., captured via the sensor), and determine a visual distance to the peripheral device based on the image. The host device may also determine a signal strength of the peripheral device, and determine a signal distance to the peripheral device based on the signal strength. The host device may pair the peripheral device to the host device if the visual distance and the signal distance are approximately equal.

In some cases, there may be other peripheral devices within a searching radius of the host device. As such, the host device may determine that it is not a user's intention to pair these other peripheral devices as the signal distances of these other devices do not approximately match the visual distance of the peripheral device. Moreover, there may be times that the image of the peripheral device also includes other peripheral devices. The host device may employ any suitable techniques, including deep learning, to determine the peripheral device that the user intends to pair with. For example, the host device may determine whether any of the peripheral devices have been paired with before, and pair with the peripheral device that has been paired with before. The host device may additionally or alternatively determine or receive indications of how the peripheral device may be used (e.g., via open software applications or a most recently used software application on the host device or via the image showing the peripheral devices), and pair with the peripheral device based on the indications. In some embodiments, the host device may use a weighting or confidence factor system to determine which peripheral device to pair with based on, for example, the distance to the peripheral device, history and/or frequency of pairing with the peripheral device, indications of how the peripheral device may be used, or any other suitable factor.

Figure 1:
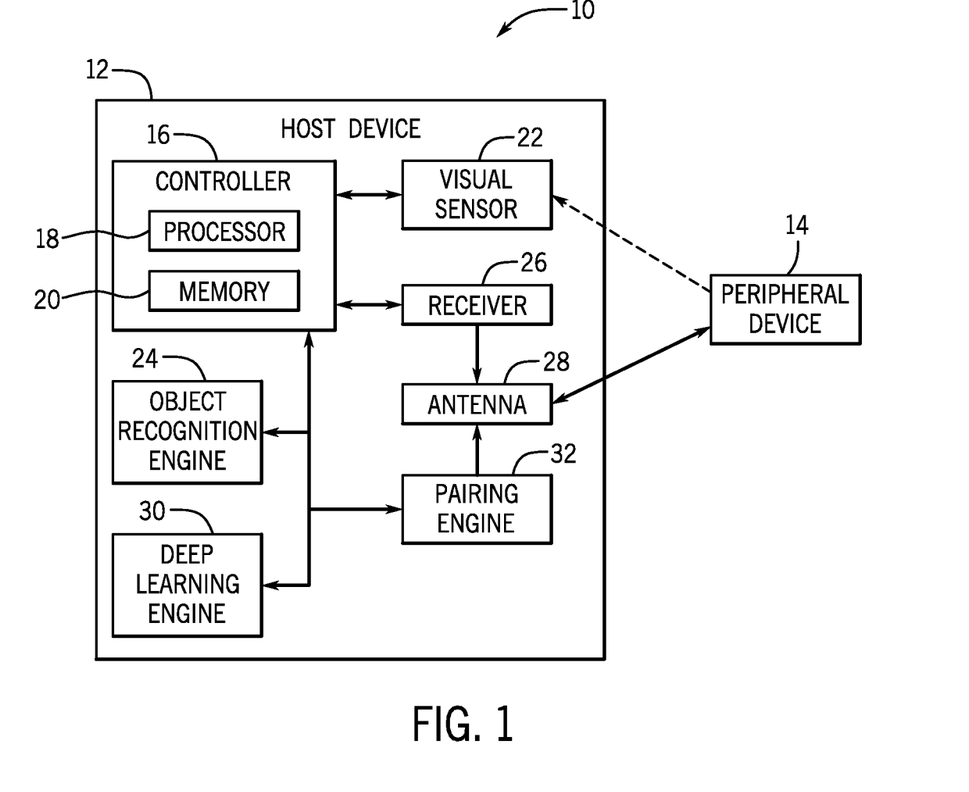
FIG. 1 is a block diagram of a peripheral device pairing system that may use visual recognition and/or machine learning, according to embodiments of the present disclosure.

With the foregoing in mind, FIG. 1 is a block diagram of a peripheral device pairing system 10 that may use visual recognition and deep learning, according to embodiments of the present disclosure. The system 10 includes a host device 12 that may be paired with a peripheral device 14. The host device 12 may include any suitable electronic device that may be paired with the peripheral device 14, such as a cell phone, smartphone, wearable device, virtual reality or mixed reality headset, tablet, desktop computer, laptop computer, or any other suitable computing device. The peripheral device 14 may include any suitable electronic device that may be paired with the host device 12, such as a set of earphones, headphones, speakers, a keyboard, mousing device, car stereo, printer, webcam, smart home device, or any other suitable electronic device.

The host device 12 may include a controller 16 that facilitates pairing with the peripheral device 14. The controller 16 may include one or more processors 18 (e.g., processing circuitry) and one or more memory devices 20 (which may include one or more storage devices). The processor 18 may execute software programs and/or instructions to facilitate pairing with the peripheral device 14. Moreover, the processor 18 may include multiple microprocessors, one or more application specific integrated circuits (ASICS), and/or one or more reduced instruction set (RISC) processors. The memory device 20 may store machine-readable and/or processor-executable instructions (e.g., firmware or software) for the processor 18 to execute, such as instructions that facilitate pairing with the peripheral device 14. As such, the memory device 20 may store, for example, control software, look up tables, configuration data, and so forth, to facilitate pairing with the peripheral device 14. In one embodiment, the processor 18 and the memory device 20 may be external to the controller 16. The memory device 20 may include a tangible, non-transitory, machine-readable-medium, such as a volatile memory (e.g., a random access memory (RAM)) and/or a nonvolatile memory (e.g., a read-only memory (ROM), flash memory, hard drive, and/or any other suitable optical, magnetic, or solid-state storage medium).

The controller 16 may receive image data from a sensor 22 of the host device 12. The sensor 22 may be a visual sensor that detects and/or captures images or videos of the peripheral device 14, and send the images or videos to the controller 16 as image data. In some embodiments, the visual sensor 22 may be a camera, such as a monocular, stereoscopic, or depth camera, or other suitable image capture device.

The system 10 may include an object recognition engine 24 that identifies the peripheral device 14 in the image data using image/object recognition techniques. For example, the object recognition engine 24 may use object recognition techniques to determine that the peripheral device 14 in the image data is a set of earphones, headphones, speakers, a keyboard, mousing device, car stereo, printer, webcam, or smart home device. The object recognition engine 24 may also use object recognition techniques to determine that other objects in the image data are not peripheral devices that may be paired with the host device 12 (such as coffee cups, pencils, paper, or the like). The object recognition engine 24 may send indications of objects recognized in the image data to the controller 16, which may then associate the peripheral device 14 with an identified object. The controller 16 may then determine a distance to (or depth of) the peripheral device 14 in the image data using image distance determination techniques.

The controller 16 may also include a receiver 26 and antenna 28 that enable receiving information from the peripheral device 14. The receiver 26 and the antenna 28 may operate using any suitable wireless communication protocol used to pair devices, such as Bluetooth, Bluetooth Low Energy (BLE), WiFi, WiMax, or ZigBee. For example, the antenna 28 may receive information related to a distance to the peripheral device 14 or information that may be used to determine the distance to the peripheral device 14. That is, the antenna 28 may receive a radio signal sent from the peripheral device 14, and the receiver 26 and/or the controller 16 may determine an indication of power present in the radio signal, such as a measurement or value of the power present in the radio signal. The receiver 26 may then send the measurement or value of the power present in the radio signal to the controller 16. In some embodiments, the measurement or value of the power present in the radio signal may be a Received Signal Strength Indicator (RSSI) value.

The controller 16 may then convert the RSSI value of the peripheral device 14 to a distance value to determine a distance from the host device 12 to the peripheral device 14. For example, the controller 16 may use the following equation that relates distance (d) and RSSI:

$$d = 10^{[(P_0 - F_m - P_r - 10 \times n \times \log_{10}(f) + 30 \times n - 32.44)/10 \times n]} \quad \text{(Equation 1)}$$

where:
- $F_m$ = Fade margin
- n = Path-Loss Exponent
- $P_0$ = Signal power (dBm) at zero distance
- $P_r$ = Signal power (dBm) at distance
- f = signal frequency in MHz The host device 12 may also include a deep learning engine 30 that facilitates determining the peripheral device 14 to pair with. The deep learning engine 30 may use any suitable machine learning techniques or architecture, such as deep neural networks, deep belief networks or recurrent neural networks. For example, the host device 12 may determine there are multiple peripheral devices 14 that may be paired with (e.g., that are at approximately the same distance away from the host device 12). The deep learning engine 30 may determine whether each peripheral device 14 has been paired before (e.g., based on a stored list of devices that have been paired with the host device 12), and determine that the peripheral device 14 that has been paired with more frequently and/or more recently is more likely the peripheral device 14 a user desires to pair with the host device 12.

The deep learning engine 30 may alternatively or additionally determine or receive one or more indications of how the peripheral device may be used (e.g., via open software applications or a most recently used software application on the host device 12 or via the image showing the peripheral devices), and determine that the peripheral device 14 that is associated with such indications is more likely the peripheral device 14 that a user desires to pair with the host device 12. For example, the deep learning engine 30 may determine that a word processing, email, messaging, or other software application is an open, recently opened, recently used, or most recently used software application on the host device 12, and determine that a peripheral device associated with such a software application (e.g., a keyboard) is more likely the peripheral device 14 that a user desires to pair with the host device 12 than a peripheral device not associated with such an application (e.g., a set of earphones). As another example, the deep learning engine 30 may determine that an audio, video, music, movie, television, streaming, or other software application is an open, recently opened, recently used, or most recently used software application on the host device 12, and determine that a peripheral device associated with such a software application (e.g., a set of earphones) is more likely the peripheral device 14 that a user desires to pair with the host device 12 than a peripheral device not associated with such an application (e.g., a set of earphones keyboard)

In some embodiments, the deep learning engine 30 may send an indication of the peripheral device 14 that the deep learning engine 30 determines a user desires to pair with the host device 12 or that has the highest likelihood of being the peripheral device 14 that the user desires to pair with the host device 12. In some embodiments, the deep learning engine 30 and/or the controller 16 may use a weighting or confidence factor system to determine which peripheral device to pair with based on, for example, the distance to the peripheral device, history and/or frequency of pairing with the peripheral device, indications of how the peripheral device may be used, or any other suitable factor.

The host device 12 may also include a pairing engine 32 that facilitates pairing the host device 12 with the peripheral device 14. In particular, the pairing engine 32 may use the antenna 28, the receiver 26, and/or any other components of the host device 12 (e.g., such as a transmitter), as well as components of the peripheral device (e.g., an antenna, a receiver, and/or a transmitter) to pair the host device 12 with the peripheral device 14.

It should be understood that the term "engine" as used herein may include and/or be implemented in hardware (e.g., circuitry), software (e.g., instructions for execution by a processor), or a combination of the two. Moreover, in additional or alternative embodiments, each or any of the object recognition engine 24, the deep learning engine 30, and the pairing engine 32 may be part of and internal to the controller 16 (e.g., in the form of circuitry of the processor 18 and/or software instructions stored in the memory device 20).

Figure 2:
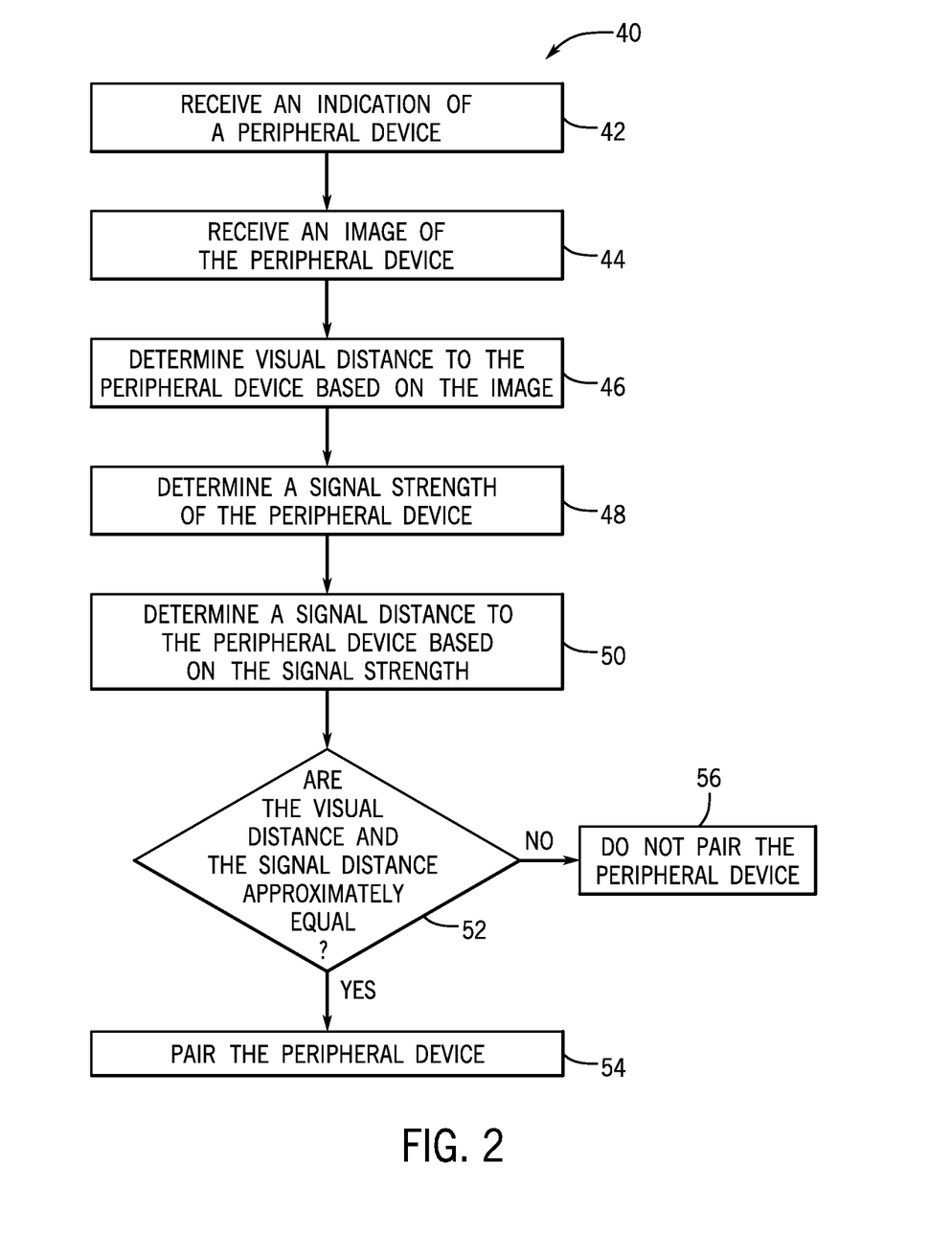
FIG. 2 is a flowchart illustrating a process for pairing a host device of FIG. 1 with a peripheral device, according to embodiments of the present disclosure.

FIG. 2 is a flowchart illustrating a process 40 for pairing the host device 12 of FIG. 1 with the peripheral device 14, according to embodiments of the present disclosure. While the process 40 is described as being performed by the processor 18, it should be understood that the process 40 may be performed by any suitable device that may pair with the peripheral device 14. Furthermore, while the process 40 is described using steps in a specific sequence, it should be understood that the present disclosure contemplates that the described steps may be performed in different sequences than the sequence illustrated, and certain described steps may be skipped or not performed altogether. In some embodiments, the process 40 may be implemented by executing instructions stored in a tangible, non-transitory, computer-readable medium, such as the memory device 20, using any suitable processing circuitry, such as the processor 18.

As illustrated, in process block 42, the processor 18 receives an indication of a peripheral device 14. In some cases, the visual sensor 22 (e.g., camera) of the host device 12 may be activated. For example, a camera or image capture software application on the host device 12 may be open. The visual sensor 22 may capture an image of the peripheral device 14, and send it to the processor 18, which may identify the peripheral device 14 using the object recognition engine 24.

In additional or alternative embodiments, a software application on the host device 12 associated with a peripheral device 14 may be opened, which may cause the visual sensor 22 to search for the peripheral device 14. For example, a user may open a word processing, email, messaging, or other software application associated with a keyboard or mousing device, and, as a result, the processor 18 may automatically search for the keyboard or mousing device. Similarly, the user may open an audio, video, music, movie, television, streaming, or other software application associated with a set of earphones, headphones, speakers, or car stereo, and, as a result, the processor 18 may automatically search for the set of earphones, headphones, speakers, or car stereo.

The processor 18 may also or alternatively periodically (e.g., every 30 seconds, every minute, or any other suitable period of time) search for peripheral devices 14. In one embodiment, the processor 18 may automatically search for peripheral devices 14 when a user places the host device 12 in a pairing mode and/or opens a configuration menu associated with pairing peripheral devices 14. For the processor 18 to receive the indication of the peripheral device 14, the peripheral device 14 may be activated and/or in a pairing mode. In such cases, an indicator 72 (e.g., a light or light-emitting diode (LED)) may indicate that the peripheral device 14 is in the pairing mode (e.g., the indicator 72 may blink).

Figure 3:
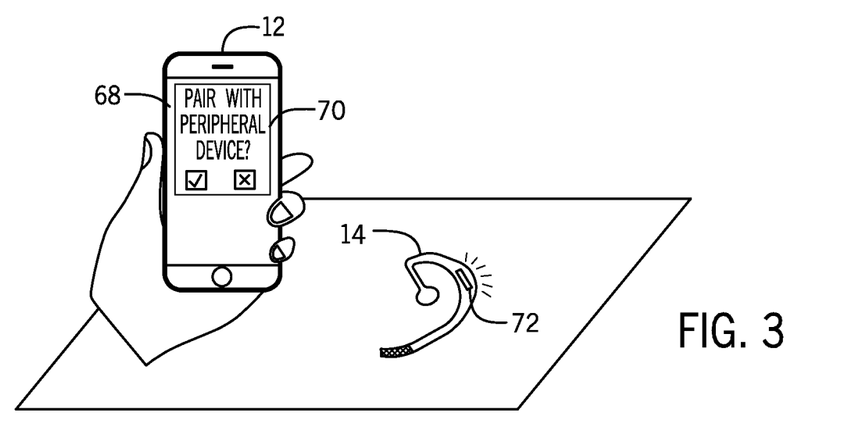
FIG. 3 is a perspective diagram of the host device of FIG. 1 displaying a prompt asking a user whether to pair with a peripheral device, according to embodiments of the present disclosure.

In some embodiments, the processor 18 may display a prompt that asks a user whether to pair with the peripheral device 14. For example, FIG. 3 is a perspective diagram of the host device 12 of FIG. 1 displaying a prompt 70 asking a user whether to pair with the peripheral device 14 (e.g., a headset), according to embodiments of the present disclosure. The prompt 70 may be displayed on a display 68 of the host device 12 as a result of the processor 18 receiving an indication of a peripheral device 14.

In process block 44, the processor 18 receives an image of the peripheral device 14. That is, the visual sensor 22 may automatically capture an image of the peripheral device 14 in response to receiving the indication of the peripheral device 14 from process block 42.

In process block 46, the processor 18 determines a visual distance to the peripheral device 14 based on the image. For example, the processor 18 may determine a distance to (or depth of) the peripheral device 14 in the image data from the host device 12 using image distance determination techniques. It should be understood that the processor 18 may, in some embodiments, use any suitable software application or software applications, such as a third party distance-determining software application, to determine the distance to the peripheral device 14. For example, the processor 18 may execute instructions of a third party software application (e.g., stored in the memory device 20) to capture an image of the peripheral device 14 and/or determine a distance to the peripheral device 14 capture in the image.

While the present disclosure discusses using a visual sensor 22 to capture the image of the peripheral device 14, and the processor 28 determining a visual distance to the peripheral device 14, it should be understood that any suitable distance-determining technique may be used to determine the distance (e.g., a visual distance) to the peripheral device 14. That is, in some embodiments, non-visual sensors may be used to determine the distance to the peripheral device 14. The non-visual sensors may include, for example, audio sensors, infrared sensors, sonar sensors, laser sensors, ultrasonic sensors, and the like. As an example, an ultrasonic sensor may be used to determine the distance to a peripheral device 14 by using a transducer to send an ultrasonic pulse to the peripheral device 14 and determine the distance to the peripheral device 14 based on receiving a returning ultrasonic pulse.

In process block 48, the processor 18 determines or receives a signal strength of the peripheral device 14. In particular, the receiver 26 and antenna 28 of the host device 12 may receive and/or determine an indication of power present in a radio signal sent from the peripheral device 14, and the receiver 26 and/or the processor 18 may determine a measurement or value of the power present in the radio signal. In some embodiments, the measurement or value of the power present in the radio signal may be a Received Signal Strength Indicator (RSSI) value.

In process block 50, the processor 18 determines a signal distance to the peripheral device 14 based on the signal strength. In particular, the processor 18 may convert a measurement or value of the power present in the radio signal to a distance associated with the peripheral device 14. For example, when the measurement or value of the power present in the radio signal is an RSSI value, the processor 18 may use Equation 1 above to convert the RSSI value to the signal distance.

In decision block 52, the processor 18 determines whether the visual distance and the signal distance are approximately equal. For instance, the processor 18 may determine the visual distance and the signal distance are approximately equal when the visual distance and the signal distance are within a suitable margin of error (e.g., 2%, 5%, 10%, or the like).

Figure 4:
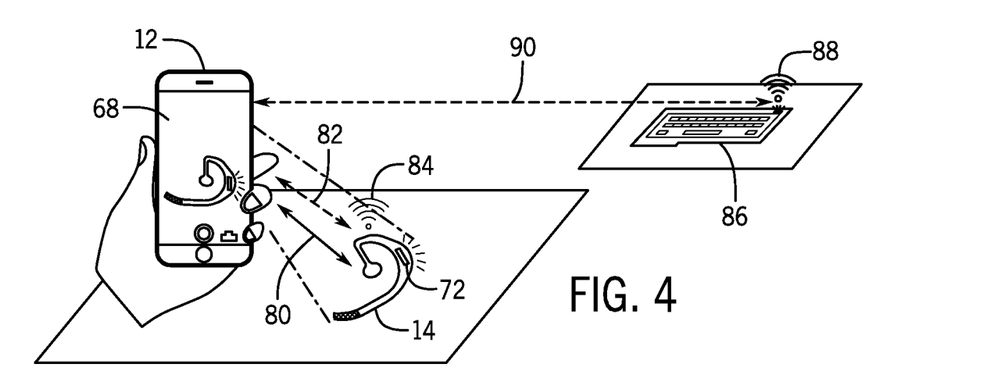
FIG. 4 is a perspective diagram of the host device of FIG. 1 determining visual and signal distances to a peripheral device, according to embodiments of the present disclosure.

For example, FIG. 4 is a perspective diagram of the host device 12 of FIG. 1 determining visual and signal distances to the peripheral device 14, according to embodiments of the present disclosure. As illustrated, a user directs or focuses the visual sensor 22 (e.g., camera) of the host device 12 at the peripheral device 14, such that the peripheral device 14 is displayed on a display 68 of the host device 12. The processor 18 may determine the visual distance 80 to the peripheral device 14 (e.g., from the image data using image distance determination techniques) and the signal distance 82 to the peripheral device 14 (e.g., based on an RSSI value 84 of the peripheral device 14).

If the processor 18 determines that the visual distance and the signal distance are approximately equal, in process block 54, the processor 18 pairs the peripheral device 14. In some embodiments, the processor 18 may confirm with the user that the peripheral device 14 should be paired with the host device 12 (e.g., for security or privacy reasons).

Figure 5:
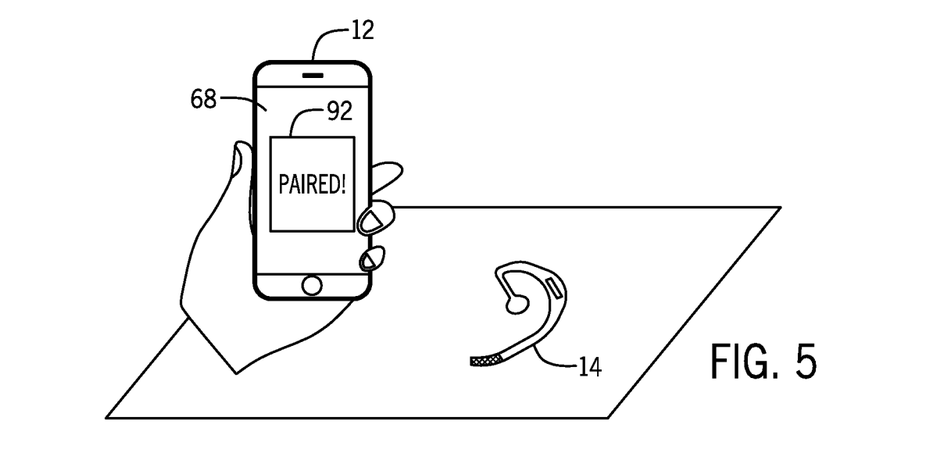
FIG. 5 is a perspective diagram of the host device of FIG. 1 completing a pairing process with a peripheral device, according to embodiments of the present disclosure.

If the processor 18 determines that the visual distance and the signal distance are not approximately equal, in process block 56, the processor 18 does not pair the peripheral device 14. In some embodiments, if the processor 18 does not pair the peripheral device 14, the user may still pair the peripheral device 14 to the host device 12 conventionally (e.g., by navigating through a configuration menu on the host device 12). Keeping the foregoing in mind, FIG. 5 is a perspective diagram of the host device 12 of FIG. 1 completing the pairing process with the peripheral device 14, according to embodiments of the present disclosure. As illustrated, the processor 18 may display a prompt 92 to indicate to the user that the peripheral device 14 is paired. In this manner, the process 40 enables pairing the host device 12 with the peripheral device 14.

In some embodiments, there may be additional peripheral devices within a search radius of the host device 12, such that searching for pairable peripheral devices may result in finding these additional peripheral devices. For example, FIG. 4 illustrates a keyboard peripheral device 86 that may be pairable with the host device 12. That is, the keyboard peripheral device 86 may, like the headset peripheral device 14, emit a radio signal with an RSSI value 88. As such, the processor 18 may also determine a signal distance 90 to the keyboard peripheral device 86 based on the RSSI value 88 of the keyboard peripheral device 86. However, because the user directs or focuses the visual sensor 22 (e.g., camera) of the host device 12 at the headset peripheral device 14, the visual distance 80 to the headset peripheral device 14 may not approximately equal the signal distance 90 to the keyboard peripheral device 86, and thus the processor 18 may not pair the keyboard peripheral device 86.

Figure 6:
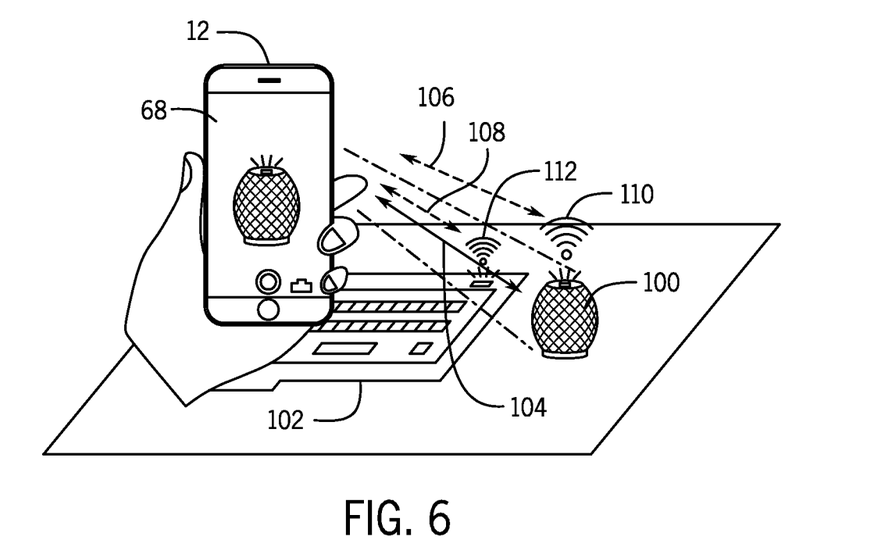
FIG. 6 is a perspective diagram of the host device of FIG. 1 focusing on a speaker peripheral device instead of a keyboard peripheral device, according to embodiments of the present disclosure.

In some cases, there may be multiple peripheral devices at approximately the same distance from the host device 12. As such, the processor 18 may determine the identity of the peripheral device 14 (e.g., using the object recognition engine 24) to determine the peripheral device 14 to pair with. For example, FIG. 6 is a perspective diagram of the host device 12 of FIG. 1 focusing on a speaker peripheral device 100 instead of a keyboard peripheral device 102, according to embodiments of the present disclosure. As illustrated, the peripheral devices 100, 102 may both be approximately the same visual distance (e.g., 104) from the host device 12 (as perceived by the visual sensor 22 of the host device 12). Moreover, the peripheral devices 100, 102 may both be approximately the same signal distance (e.g., 106, 108, respectively) from the host device 12 (based on respective RSSI values 110, 112 of the peripheral devices 100, 102). However, because the user directs or focuses the visual sensor 22 of the host device 12 at the speaker peripheral device 100 as shown in FIG. 6, the processor 18 may identify the peripheral device that the user desires to pair as the speaker peripheral device 100. As such, the processor 18 may pair with the speaker peripheral device 100 (e.g., in process block 54).

Figure 7:
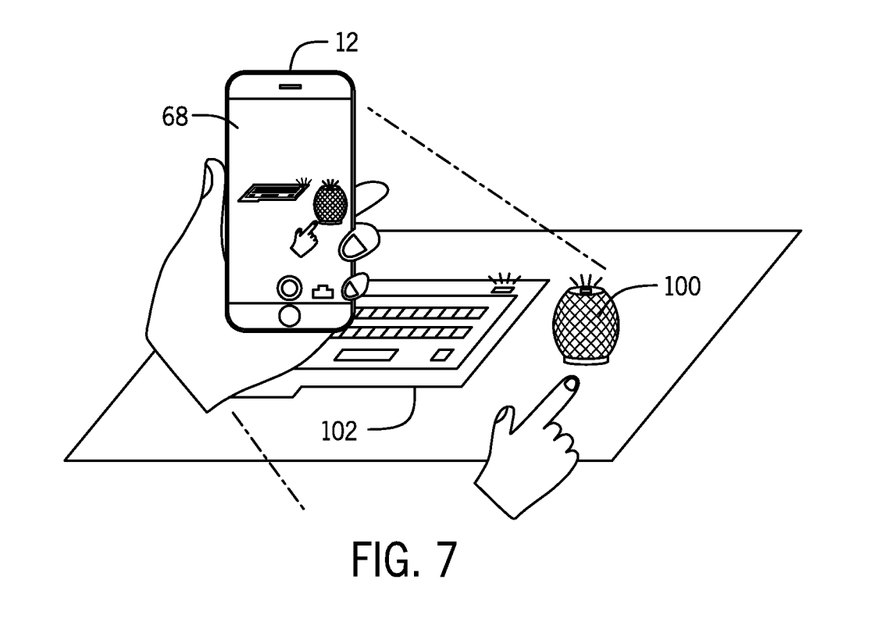
FIG. 7 is a perspective diagram of the host device of FIG. 1 capturing an image of both the speaker peripheral device and the keyboard peripheral device of FIG. 6, according to embodiments of the present disclosure.

There may be circumstances where more than one pairable device is shown in the image captured by the visual sensor 22. For example, in FIG. 7 is a perspective diagram of the host device 12 of FIG. 1 capturing an image of both the speaker peripheral device 100 and the keyboard peripheral device 102 of FIG. 6, according to embodiments of the present disclosure. In such a case, the deep learning engine 30 may determine whether each of the peripheral devices 100, 102 has been paired before (e.g., based on a stored list of devices that have been paired with the host device 12), and determine that the peripheral device that has been paired with more frequently and/or more recently is more likely the peripheral device a user desires to pair with the host device 12.

Additionally or alternatively, the processor 18 may use the deep learning engine 30 to determine or receive indications of how the peripheral device desired to be paired with may be used (e.g., via open software applications or a most recently used software application on the host device 12 or via the image showing the peripheral devices), and determine that the peripheral device that is associated with such indications is more likely the peripheral device that a user desires to pair with the host device 12. For example, the deep learning engine 30 may determine that a word processing, email, messaging, or other software application is an open, recently opened, recently used, or most recently used software application on the host device 12, and determine that the keyboard peripheral device 102 is associated with such a software application, and thus is more likely the peripheral device that the user desires to pair with the host device 12 than the speaker peripheral device 100. As another example, the deep learning engine 30 may determine that an audio, video, music, movie, television, streaming, or other software application is an open, recently opened, recently used, or most recently used software application on the host device 12, and determine that the speaker peripheral device 100 is associated with such a software application, and thus is more likely the peripheral device that the user desires to pair with the host device 12 than the keyboard peripheral device 102.

Figure 8:
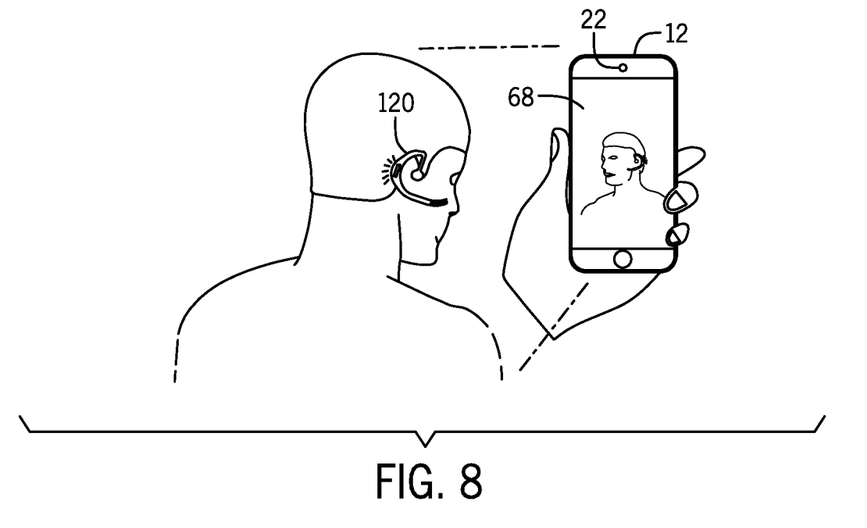
FIG. 8 is a perspective diagram of the host device of FIG. 1 capturing an image of a user wearing a peripheral device, according to embodiments of the present disclosure.

In some embodiments, the indications of how the peripheral device may be used may be provided in the image data captured by the visual sensor 22. For example, one indication may be a proximity of the peripheral device to the user, such as if the user is wearing or holding the peripheral device. As an example, FIG. 8 is a perspective diagram of the host device 12 of FIG. 1 capturing an image of a user wearing a peripheral device 120 (e.g., a headset), according to embodiments of the present disclosure. In this case, the host device 12 uses a rear-facing or user-facing visual sensor 22 (e.g., a camera). The processor 18 may determine that the user is wearing the peripheral device 120 using the object recognition engine 24. Using the deep learning engine 30, the processor 18 may determine that, because the user is wearing the peripheral device 120, even if there are other pairable peripheral devices nearby, if the peripheral device 120 is unpaired, the user desires to pair the host device 12 with the peripheral device 120. As such, the processor 18 may pair the peripheral device 120 with the host device 12.

Figure 9:
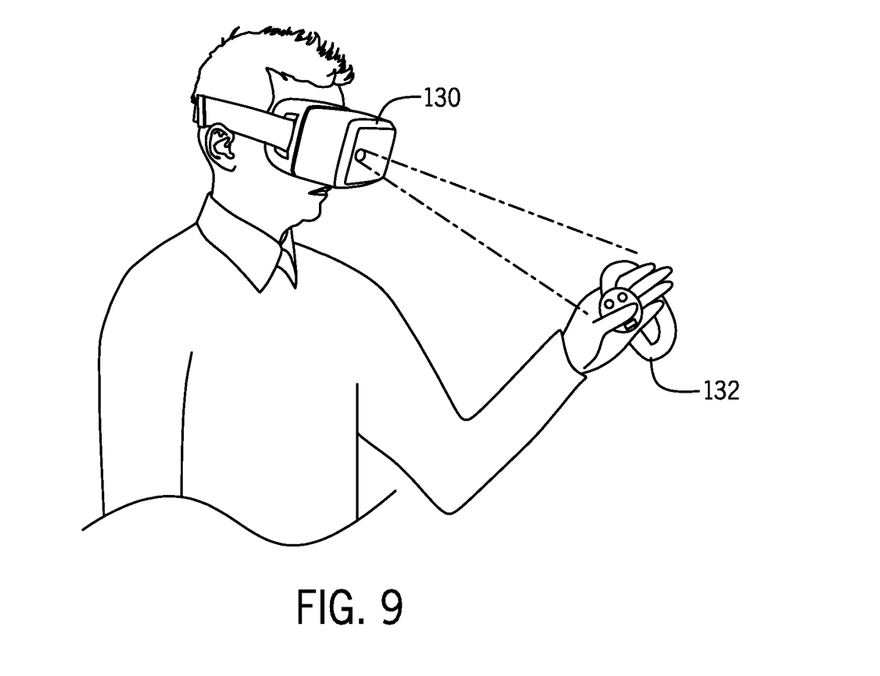
FIG. 9 is a perspective diagram of an example host device capturing an image of a peripheral device to be paired with, according to embodiments of the present disclosure.

Similarly, FIG. 9 is a perspective diagram of an example host device 130 capturing an image of a peripheral device 132 (e.g., a wrist controller) to be paired with, according to embodiments of the present disclosure. In this case, the host device 130 is a virtual reality or mixed reality headset. As illustrated, the user directs his focus (and the focus of a visual sensor 22 or camera) to the peripheral device 132. The processor 18 of the host device 130 may determine that the user is holding the peripheral device 132 using the object recognition engine 24. Using the deep learning engine 30, the processor 18 may determine that, because the user is holding the peripheral device 132, even if there are other pairable peripheral devices nearby, if the peripheral device 132 is unpaired, the user desires to pair the host device 130 with the peripheral device 132. As such, the processor 18 may pair the peripheral device 132 with the host device 130. It should be understood that the peripheral device 132 may include any suitable peripheral devices, including any suitable virtual reality or mixed reality peripheral devices, such as virtual reality or mixed reality input controllers, handheld units, and/or gloves (e.g., any of which may include input devices such as track pads, buttons, triggers, analog sticks, and/or the like).

The processor 18 may also or alternatively enable a user to provide an indication of the peripheral device that the user desires to pair with the host device 12. For example, the processor 18 may enable the user to point at, snap his or her fingers at, draw a circle around, or perform any other suitable indicating gesture at the peripheral device the user desires to pair with the host device 12. As illustrated in FIG. 7, the user points his or her fingers at the speaker peripheral device 100, indicating that the speaker peripheral device 100 is the peripheral device he or she desires to be paired with the host device 12. As such, the processor 18 may pair the speaker peripheral device 100 with the host device 12.

In some cases, where the indication of the peripheral device 14 is received based on activating and/or placing the peripheral device 14 in a pairing mode, the processor 18 may receive an identifier of the peripheral device 14. The identifier may include device specific characteristics, such as a device manufacturer, a device type, a device model, or the like. The processor 18 may determine the device specific characteristics, which may be used to, for example, identify the peripheral device 14 among additional peripheral devices in the image of the peripheral device 14.

In some embodiments, the deep learning engine 30 and/or the processor 18 may use a weighting or confidence factor system to determine which peripheral device to pair with based on, for example, the distance to the peripheral device, history and/or frequency of pairing with the peripheral device, indications of how the peripheral device may be used, or any other suitable factor.

In some circumstances, the processor 18 may receive the indication of the peripheral device 14, but the peripheral device 14 may not be in view. That is, the visual sensor 22 (e.g., camera) of the host device 12 at the peripheral device 14 may not detect the peripheral device 14, and as such may not display the peripheral device 14 on the display 68 of the host device 12. In some embodiments, the processor 18 may determine an approximate location of the peripheral device 14 based on receiving the indication of power present in the radio signal sent from the peripheral device 14 and/or determining the measurement or value of the power present in the radio signal. The processor 18 may then indicate the approximate location of the peripheral device 14. For example, the processor 18 may display an arrow directed at or a box surrounding the approximate location of the peripheral device 14 on the display 68.

In some embodiments, the host device 12 may include a device usable by multiple users, such as a music, video, or other media streaming device provided by a service, and the peripheral device 14 may include a smartphone, wearable device, laptop computer, or other computing device of a user. For example, the host device 12 may be a public streaming device (e.g., in an airport, library, museum, or any other suitable public facility). The host device 12 may include or be coupled to a visual sensor (e.g., camera) that may receive the indication of the peripheral device 14 (e.g., by having the user hold and/or point to the peripheral device 14). For example, the visual sensor may be associated with a sign, graphic, or other indication that indicates that users interested in the streaming service should show hold their peripheral device 14 and/or point to the peripheral device 14. Based on performing the process 40, for example, the processor 18 of the host device 12 may then pair the peripheral device 14 to the host device 12, thus enabling users to use the public streaming service.

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A device pairing system comprising:
    a peripheral device; and
    a host device comprising:
        an antenna configured to receive a signal from the peripheral device;
        a receiver configured to determine a signal strength from the signal;
        a camera configured to capture an image of the peripheral device; and
        a controller comprising a processor configured to:
            determine a signal distance to the peripheral device from the host device based on the signal strength of the peripheral device, wherein the signal distance is determined by equation: $d=10^{[(P_0-F_m-P_r-10\times n\times log_{10}(f)+30\times n-32.44)/10\times n]}$ wherein d is the signal distance, $F_m$ is fade margin, n is path-loss exponent, $P_0$ is signal power at zero distance, $P_r$ is signal power at distance, and f is signal frequency in megahertz; and
            pair the host device with the peripheral device based on the image of the peripheral device and the signal distance of the peripheral device.

2. The device pairing system of claim 1, wherein the peripheral device comprises a set of earphones, headphones, speakers, a keyboard, mousing device, car stereo, printer, webcam, or smart home device.

3. The device pairing system of claim 1, wherein the host device comprises a cell phone, smartphone, wearable device, virtual reality or mixed reality headset, tablet, desktop computer, or laptop computer.

4. The device pairing system of claim 1, wherein the signal strength comprises a Received Signal Strength Indicator (RSSI) value.

5. A host device comprising:
    an antenna configured to receive a signal from a peripheral device;
    a receiver configured to determine a signal strength from the signal;
    a camera configured to capture an image of the peripheral device; and
    a processor configured to:
        determine a visual distance to the peripheral device based on the image of the peripheral device;
        determine a signal distance to the peripheral device based on the signal strength of the peripheral device, wherein the signal distance is determined by equation: $d=d=10^{[(P_0-F_m-P_r-10\times n\times log_{10}(f)+30\times n-32.44)/10\times n]}$, wherein d is the signal distance, $F_m$ is fade margin, n is path-loss exponent, $P_0$ is signal power at zero distance, $P_r$ is signal power at distance, and f is signal frequency in megahertz; and
        pair the host device with the peripheral device based on the visual distance being approximately equal to the signal distance of the peripheral device.

6. The host device of claim 5, wherein the processor is configured to determine to pair the host device with the peripheral device based on a pairing history between the host device and the peripheral device.

7. The host device of claim 5, comprising a deep learning engine configured to facilitate determining to pair the host device with the peripheral device.

8. The host device of claim 7, wherein the deep learning engine is configured to determine one or more indications of how the peripheral device is used.

9. The host device of claim 8, wherein the one or more indications are based on an identity of the peripheral device.

10. The host device of claim 5, comprising a deep learning engine configured to determine whether the peripheral device is associated with the software application.

11. The host device of claim 8, wherein the one or more indications are based on a user wearing or holding the peripheral device.

12. The host device of claim 5, wherein the processor is configured to determine to pair the host device with the peripheral device based on a user gesture indicating the peripheral device.

13. A method for pairing a host device with a peripheral device comprising:
receiving an image of the peripheral device;
determining a visual distance to the peripheral device based on the image of the peripheral device;
determining a signal strength of the peripheral device;
determining a signal distance to the peripheral device based on the signal strength of the peripheral device, wherein the signal distance is determined by equation: $d=10^{[(P_0-F_m-P_r-10 \times n \times log_{10}(f)+30 \times n-32.44)/10 \times n]}$, wherein d is the signal distance, $F_m$ is fade margin, n is path-loss exponent, $P_0$ is signal power at zero distance, $P_r$ is signal power at distance, and f is signal frequency in megahertz; and
pairing the host device with the peripheral device based on the visual distance being approximately equal to the signal distance of the peripheral device.

14. The method of claim 13, comprising periodically searching for the peripheral device, wherein receiving the image of the peripheral device occurs in response to finding the peripheral device.

15. The method of claim 13, comprising searching for the peripheral device in response to receiving an indication that a software application associated with the peripheral device was opened on the host device, wherein receiving the image of the peripheral device occurs in response to finding the peripheral device.

16. The method of claim 13, comprising searching for the peripheral device in response to receiving the image of the peripheral device.

17. The host device of claim 12, wherein the user gesture comprises pointing at the host device, snapping at the host device, drawing a circle around the peripheral device, or any combination thereof.

18. The device pairing system of claim 1, wherein the processor is configured to determine the software application as the most recent software application executed on the host device.

19. The device pairing system of claim 1, wherein the processor is configured to identify the peripheral device based on a weighting or confidence factor.

20. The device pairing system of claim 19, wherein the weighting or the confidence factor is based on a distance to the peripheral device, a history of pairing with the peripheral device, a frequency of pairing with the peripheral device, an indication of how the peripheral device is used, or any combination thereof.

* * * * *